United States Patent Office 3,330,167
Patented July 11, 1967

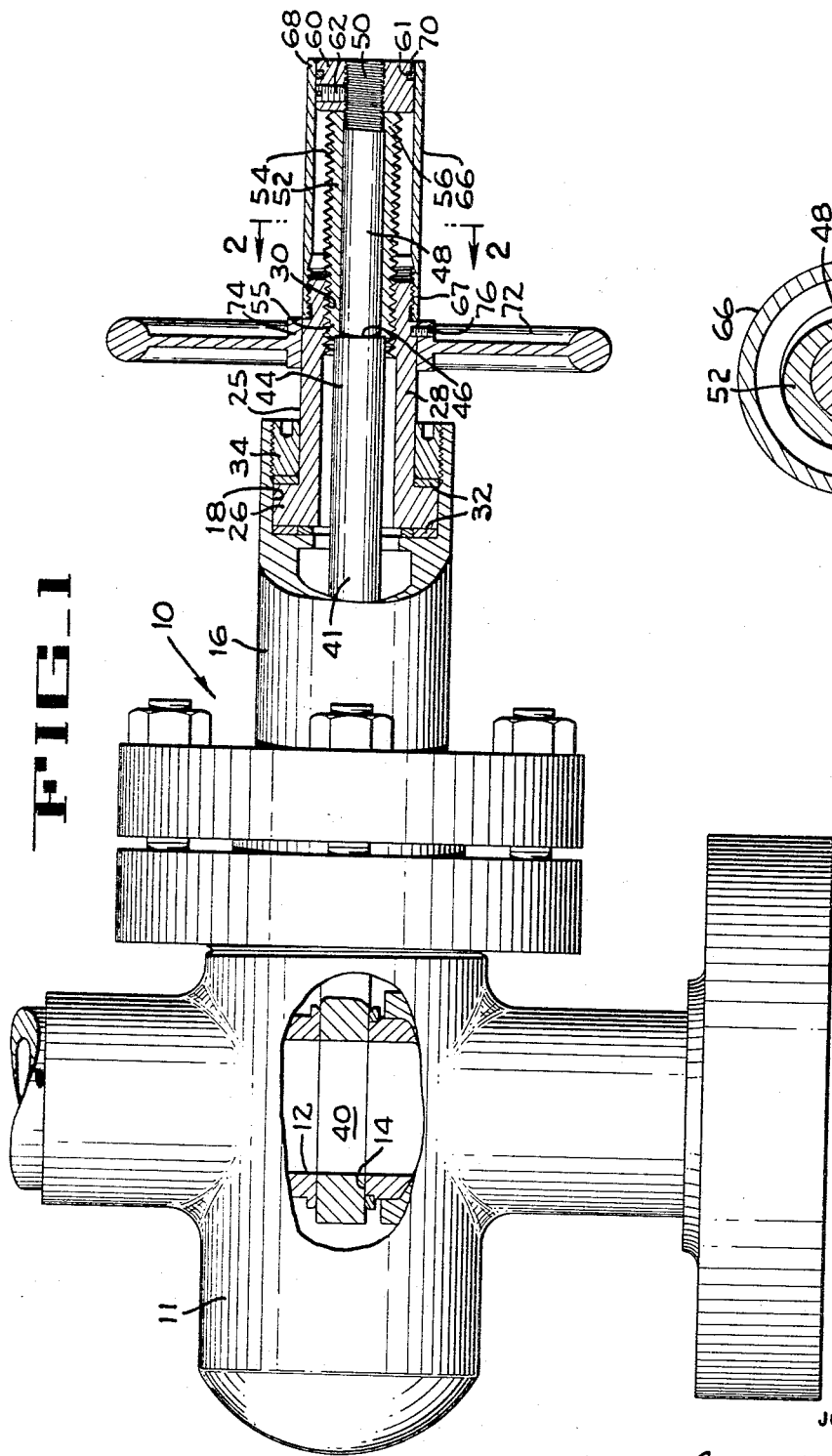

3,330,167
TORQUE OVERLOAD RELEASING DEVICE
John R. Yancey, Houston, Tex., assignor to FMC Corporation, San Jose, Calif., a corporation of Delaware
Filed June 28, 1965, Ser. No. 467,661
6 Claims. (Cl. 74—424.8)

ABSTRACT OF THE DISCLOSURE

The operating stem of a valve is frictionally engaged by an externally threaded sleeve which is engaged with an axially immovable, rotatable stem nut. Rotation of the stem nut by a handwheel provides longitudinal movement of the stem when the required torque is less than will be accommodated by the friction connection between the stem and sleeve. Turning torque in excess of the required torque causes relative rotation between the stem and sleeve so as to preclude breakage of the stem.

---

The present invention pertains to a torque overload releasing device and more particularly to such a device for precluding application of excessive torque to a valve stem when the same is seated or there is resistance to its movement.

As is well known, a gate valve includes a stem connected to a gate and mounted in a valve body for non-rotatable, axial movement between open and closed positions of the valve. Conventionally, the stem projects into a stem nut, which is rotatable on the body, and which is threadably connected to the stem. Upon rotation of the stem nut, usually by a hand wheel, axial movement is imparted to the stem in order to open and close the valve.

A problem of stem breakage has occurred with this conventional valve construction when workmen in the field have imposed excessive torque to the valve stem when the valve is closed or the stem is stuck and cannot move. If the stem breaks, it may be blown out of the valve, oil or gas may escape, or an oil well to which the valve is connected may gush out of control. Thus, stem breakage may cause serious injury or damage to life and property.

In the past, efforts have been made to overcome this problem by connecting the hand wheel to the stem nut by a set screw which would shear when excessive torque is applied. When this happened, however, workmen would frequently place a pipe wrench directly on the stem nut and apply excessive torque thereby resulting in breakage of the stem. The present invention overcomes this problem so that, even if a pipe wrench is applied in this manner, it will be ineffective for exerting torque to the stem.

It is an object of the present invention to provide a torque overload releasing device.

Another object is to provide a device for preventing the application of excessive torque to a stem which is immobilized.

Another object is to provide a device for precluding breakage of the stem of a valve, as a result of the application of an excessive torque to the stem, whereby damage and injury to life and property are avoided.

Another object is to provide a torque overload releasing device for a gate valve which is effective to prevent application of excessive torque to an immobilized valve stem even if it is attempted to apply such torque by pipe wrench placed directly on the stem nut.

These, together with other objects will become apparent upon reference to the following description and accompanying drawings, in which:

FIGURE 1 is a side elevation of a gate valve, partially broken away to show internal details, and incorporating the torque overload releasing device of the present invention.

FIGURE 2 is an enlarged transverse section taken on a plane indicated by line 2—2 in FIG. 1.

Referring more particularly to the drawing, a gate valve is generally identified by the numeral 10 and includes a body 11 having a flow passage 12 therethrough, a seat 14 surrounding the passage, and a tubular portion 16 projecting transversely of the flow passage in alignment with the seat and providing an outwardly opening socket 18.

The gate valve 10 also includes a stem nut 25 having a cylindrical flange 26 rotatably received within the socket 18 and a cylindrical shank 28 projecting out of the tubular portion 16. The shank has an outer end which is provided with internal threads 30. Annular bearings 32 are provided both inwardly and outwardly of the flange, and a collar 34 is threaded into the socket against the outer bearing for retaining the stem nut in the socket. As is well known in the art, the stem nut is thus mounted for rotatable movement with respect to the body 11.

In addition, the gate valve 10 includes a gate 40 slidably disposed in the seat 14 and a valve stem 41 connected to the gate and projecting outward through the tubular portion 16 and the stem nut 25. The stem has an enlarged inner portion 44, a shoulder 46 projecting radially inward from the inner portion, and a reduced outer portion 48 projecting axially outward from the shoulder and having a cylindrical external surface and a threaded end portion 50. The gate and stem are thus mounted for movement axially of the stem, with respect to the body 11, between closed and open positions but are prevented from rotating about the axis of the stem.

The torque overload releasing device of the present invention includes a sleeve 52 circumscribing the outer portion 48 of the stem 41. This sleeve has an internal cylindrical surface in friction-tight engagement with the external cylindrical surface of the outer portion 48. The sleeve also has external threads 54 engaging the internal threads 30 of the stem nut 25, an inner end 55 abutting the shoulder 46, and an outer end 56. The sleeve is fitted on the stem so tightly that under normal operating conditions the sleeve and the stem move as a unit; that is, there is no relative rotation of the sleeve on the stem during normal operating conditions. However, the sleeve will slip, like an overloaded clutch, upon the application of a predetermined torque through the sleeve to the stem, as discussed below.

A collar 60 is threaded on the end portion 50 of the stem and tightened against the outer end 56 of the sleeve 52. This collar has an outwardly opening annular groove 61 therein, and a set screw 62 extends radially through the collar for retaining the collar on the stem. Thus, the sleeve is held against axial movement relative to the stem 41 by the shoulder 46 and the collar 60.

A tubular extension 66 for the stem nut 25 has an inner end 67 threaded on the shank 28 of the stem nut and an outer end 68 surrounding the collar 60. An O-ring seal 70 is located in the groove 61 of the collar and is in sealing engagement with the extension and with the collar. A hand wheel 72 includes a tubular hub 74 fitted on the stem nut 25 and held against movement relative to the stem nut by a set screw 76 which extends through the hub and into the nut.

During normal operation of the gate valve 10, the hand wheel 72 is rotated to open and close the valve. Thus, when the hand wheel is turned, it rotates the tubular extension 66 and the stem nut 25, causing axial movement of the stem 41 and gate 40 through the threaded connections at 30 and 54 between the stem nut and the sleeve 52. During this normal operation, the sleeve does not move relative to the stem because of the frictional engagement between the sleeve and the stem and the shoulder 46 and collar 60.

The torque overload releasing device of the present invention is effective if excessive torque is applied to the stem 41 either after the gate 40 is fully seated or if the stem becomes stuck and thus immobilized for some reason. Thus, if the stem cannot move axially and torque of a predetermined amount is applied through the hand wheel 72 to the stem nut 25 and thus to the sleeve 52, the sleeve will rotate on the stem so that efforts to move the stem with the hand wheel are ineffectual. If excessive torque applied to the handwheel causes the set screw 76 to shear and if a workman then places a pipe wrench on the stem nut 25, in an effort to move the stem, the sleeve will once again simply rotate on the outer reduced portion 48 of the stem. It will therefore be evident that, in either event, the sleeve acts to release this excessive torque and to protect the stem against breakage.

When slippage of the sleeve 52 occurs, the operator will be warned that either the gate 40 is fully seated or else that the stem 41 and gate are stuck and that, in the latter event, repairs are necessary. When the stem is once again freed for axial movement, the sleeve will resume its original function of transmitting the drive from the stem nut 25 to the stem.

From the foregoing, it will be understood that a torque overload releasing device has been provided which is particularly suited for use in a gate valve to prevent breakage of the stem and to avoid resultant damage to life and property. The overload releasing device of the present invention functions like a clutch in that, during normal operation, it transmits drive from the rotating member to the axially moving member and, when the axially moving member is immobilized, it slips thereon to prevent application of the excessive torque to the axially moving member.

Although a preferred embodiment of the present invention has been shown and described, it will be understood that the various changes and modifications may be made in the details thereof without departing from the spirit and the scope of the appended claims.

Having described the invention, what is claimed as new and desired to be secured by Letters Patent is as follows:

1. In an apparatus including a body, a stem, means mounting the stem in the body for non-rotatable axial movement relative to the body, and a stem nut rotatably mounted on the body in surrounding relation to the stem, a device for axially moving the stem in response to rotation of the nut while precluding application of excessive torque to the stem comprising slip connection means frictionally engaging the stem and normally held against rotation relative to the stem but being rotatable relative to the stem upon application of a predetermined torque thereto when there is resistance to movement of the stem, and means interconnecting said slip connection means and nut for imparting axial movement to said slip connection means and stem in response to rotation of said stem nut when the applied torque is less than said predetermined torque and for rotating said slip connection means with respect to said stem when said applied torque is equal to said predetermined torque.

2. In an apparatus including a body, a stem nut rotatably mounted on the body, and a stem projecting into the nut and being mounted in the body for non-rotatable axial movement relative to the body and nut, the combination of a sleeve tightly fitted on the stem but being rotatable relative to the stem upon the application of predetermined torque to the sleeve when the stem is immobilized, and means threadably interconnecting said sleeve and the nut for axially moving the stem in response to rotation of the nut except when the torque applied to the sleeve is greater than said predetermined torque whereupon the sleeve rotates on the stem.

3. In a valve including a body, a stem nut rotatably mounted in the body, said nut having internal threads, a valve stem projecting into the nut and being mounted in the body for non-rotatable axial movement, said stem having a cylindrical portion, said stem being subject to breakage if efforts are made to move it when it is stuck, the combination of a sleeve surrounding said stem and having a cylindrical inner surface in friction-tight engagement with said cylindrical portion of the stem, said sleeve having external threads in engagement with the internal threads on the nut whereby rotation of the nut imparts axial movement to the sleeve and the stem and whereby, if a predetermined torque is applied to the stem when the same is immobilized, said sleeve is rotated relative to the stem thereby avoiding stem breakage.

4. The valve of claim 3 wherein said stem has a reduced diameter portion constituting said cylindrical portion, a larger diameter portion, and a shoulder between said portions, and wherein said sleeve is fitted on the reduced diameter portion and is in abutment with said shoulder.

5. The valve of claim 4 wherein said reduced diameter portion of the stem has an end portion projecting from said sleeve, a collar connected to said end portion and abutting the sleeve at the end thereof opposite from the end which is in engagement with said shoulder.

6. The valve of claim 5 including a tubular extension connected to the stem nut in circumferentially spaced relation to the sleeve and in surrounding relation to said collar, a seal between said collar and said extension, and means connected to said stem nut for imparting rotation to said nut.

References Cited
UNITED STATES PATENTS

| | | | |
|---|---|---|---|
| 622,912 | 4/1899 | Corey | 251—81 |
| 1,990,090 | 2/1935 | Packard | 251—81 |
| 2,858,919 | 11/1958 | Jones | 192—56 |
| 3,277,736 | 10/1966 | Goodman | 74—424.8 |
| 3,277,737 | 10/1966 | Goodman | 74—424.8 |

DONLEY J. STOCKING, *Primary Examiner.*

DAVID J. WILLIAMOWSKY, *Examiner.*

L. H. GERIN, *Assistant Examiner.*